United States Patent [19]
Goetcheus et al.

[11] Patent Number: 5,444,767
[45] Date of Patent: Aug. 22, 1995

[54] SYSTEMS AND METHODS FOR RECORDING AND DELIVERING PERSONALIZED AUDIO MESSAGES

[75] Inventors: Gregory J. Goetcheus, 2039 N. Kenmore, Apt. 1, Chicago, Ill. 60614; Robert J. Clarke, Collinsville; Richard H. Russell, Farmington, both of Conn.

[73] Assignee: Gregory J. Goetcheus, Chicago, Ill.

[21] Appl. No.: 208,736

[22] Filed: Mar. 9, 1994

[51] Int. Cl.6 .............................................. H04M 1/64
[52] U.S. Cl. ........................................ 379/67; 379/88; 379/89; 379/201; 40/124.1; 40/455; 206/232; 380/23
[58] Field of Search ............................ 379/67, 88, 89; 40/124.1; 381/51; 446/297; 360/137; 380/23; 206/232

[56] References Cited

U.S. PATENT DOCUMENTS

| | | | |
|---|---|---|---|
| 4,827,512 | 5/1989 | Hirokawa et al. | 380/23 |
| 4,920,558 | 4/1990 | Hird et al. | 379/88 |
| 5,045,327 | 9/1991 | Tarlow et al. | 381/51 |
| 5,063,698 | 11/1991 | Johnson et al. | 40/124.1 |
| 5,166,851 | 11/1992 | Jacobson | 360/137 |
| 5,251,251 | 10/1993 | Barber et al. | 379/67 |
| 5,279,514 | 1/1994 | Lacombe et al. | 446/297 |

Primary Examiner—James L. Dwyer
Assistant Examiner—Parag Dharia
Attorney, Agent, or Firm—David P. Gordon

[57] ABSTRACT

Systems and methods for recording and delivering personalized audio messages are provided. The system includes a central facility computer system (CF), a store front programming system (SFS), and a portable playback device (PPD). When a customer desires to send a personalized message to another person, the customer communicates via a telecommunications channel with the CF. Under control of a CF processor, a outgoing message module of the CF provides instructions to the customer, who enters required information and provides the personalized audio message. The personalized audio message is digitized by a CF voice digitizer and transmitted from the CF via a data interface to the SFS. The SFS receives the digitized personalized audio message data from the CF and uses its playback device programmer to program data representing the audio message onto the PPD. The PPD is an audio chip having a nonvolatile memory, an external switch, a battery and a speaker. When the switch is pressed, the data representing the audio message stored in the memory is sent to the speaker (via a D/A converter where the data is digital) where a facsimile of the original audio message is heard.

25 Claims, 7 Drawing Sheets

SYSTEMS AND METHODS FOR RECORDING AND DELIVERING PERSONALIZED AUDIO MESSAGES

BACKGROUND OF THE INVENTION

1. Field of the Invention

The present invention relates to systems and methods for recording and delivering personalized audio messages. In particular the present invention relates to systems and methods for generating devices such as greeting cards with non-erasable personalized audio messages contained thereon.

2. State of the Art

The greeting card industry manufactures and sells greeting cards of many different types and for many different occasions. The greeting card is intended to assist consumers in expressing their feelings and/or in helping the consumers find the appropriate things to say at particular times. Greeting cards are often sent at holiday times, birthdays, anniversaries, etc. Greeting cards also often accompany gifts. Because of the great number of greeting cards available with many different messages, greeting cards attempt to inject a personal aspect to the communication. However, the message of the card rarely expresses exactly what the consumer wishes to say.

U.S. Pat. No. 2,976,049 to J. J. Ronci, discloses a talking greeting card which produces an audible message or greeting. The greeting card includes a small phonograph disk which is rotatably connected to the greeting card and a needle. The needle presses against the disk grooves as the disk is rotated manually by the user. The needle vibrates, transmitting the vibrations through the card, amplifying the resulting sound waves. While such an arrangement could produce an audio message on a greeting card, it will be appreciated that the quality of the sound would be very poor, and that the arrangement is bulky and unlikely to be commercialized.

Other greeting cards have been manufactured which play synthesized music when the card is opened. In particular, cards incorporating a memory, an oscillator/speaker, and a battery are known, where the card is activated by a switch when the card is opened. These types of greeting cards generally play "Happy Birthday", a holiday tune, or some other recognizable melody which is matched with the purpose of the card and which is preprogrammed by the manufacturer. This design provides the card with an audible message but does not allow the user to personalize the message.

Recently, personal audio messages have been combined with a Christmas tree ornament. The ornament is effectively provided with an analog audio system (i.e., miniature tape recorder) which allows the user to press a button and record a personal message. Upon pressing of a playback button, the message can be played back by the receiver of the personal message. While this arrangement permits a personal message to be provided, the arrangement is less than optimal in that it requires that the sender physically manipulate the ornament in making the message (i.e., the sender must physically obtain the ornament and "program" it). In addition, the message can be either intentionally or accidentally "overwritten" by the receiver of the ornament, and the ornament can then be provided with another message. Further, because both recording and replaying technology is required on the ornament, and the ornament is utilizing analog technology, the ornament is quite expensive.

Digital audio technology in the form of semiconductor chips has also recently been made available. The chips permit direct recording of audio information onto the chip, and a playback of that audio information from the chip. These chips have been used as part of a message center which permits a consumer to record a personalized audio message. As with the Christmas tree ornament, the provided system requires that the user activate the system for recording the message. In addition, because the system is intended for use as a message center, it is expected that the message will be regularly overwritten with additional messages which can be accessed by the receiver of the message.

SUMMARY OF THE INVENTION

It is therefore an object of this invention to provide a system and method for recording and delivering personalized audio messages.

It is another object of this invention to provide a system and method for recording and delivering personalized audio messages from remote locations.

It is a further object of this invention to provide a system and method for generating personalized audio messages for greeting cards where the greeting card message cannot be mistakenly overwritten by the receiver of the greeting card.

In accord with these objects which will be discussed below the preferred system for recording and delivering personalized audio messages includes a central facility computer system, a store front programming system, and a portable playback device. The central facility computer system incorporates a recorded/synthesized outgoing message module, a touch tone interface, an incoming voice digitizer, a telephone data interface (e.g., modem), and a processor. When a person desires to send a personalized message to another person, the sender communicates via a telephone line with the central facility system. Under control of the processor, the recorded/synthesized outgoing message module provides instructions to the sender, who enters required information and provides the personalized audio message. The personalized audio message is digitized by the incoming voice digitizer and transmitted from the central facility via the telephone data interface to the store front system.

The store front system includes a telephone data interface, a processor, a playback device programmer, an in-store voice digitizer, and an internal playback device. The store front system receives the digitized personalized audio message data from the central facility system via both the store front and the central facility telephone data interfaces. The digital message is then programmed by the playback device programmer onto the portable playback device (digital or analog audio chip). The store front system also has the ability to directly receive and record audio messages via use of a microphone attached to the in-store voice digitizer. The recorded messages may be heard through a speaker attached to the internal playback device.

The portable playback device preferably incorporates a nonvolatile message memory, a speaker, a control unit (sequencer), a power controller module, a battery and an external start switch. Where the nonvolatile message memory is a digital EPROM or the like, a digital-analog (D/A) converter is also provided as part of the portable playback device, whereas when a solid state analog nonvolatile message memory is utilized, the D/A converter is not required. A preferred embodiment of the portable playback device is a greeting card. Upon the opening the greeting card, the external start switch activates the playback device, which, under control of the sequencer, sends the audio message stored in the nonvolatile message memory to the speaker. Where the message memory is digital, the audio message is sent to the speaker via the D/A converter which converts the digital audio message to an analog signal and transmits the signal through the speaker. Regardless, the resulting audio message is substantially similar in sound to the personalized audio message as the customer originally recorded it.

It will be appreciated that the system of the invention is advantageously utilized in conjunction with florist services so that when flowers are sent via a wire service, a personalized audio card or ornament can be sent with the flowers. The system of the invention likewise could be utilized with other gift items such as teddy bears where the card with the personalized audio message could be included in or on the box, or where the personalized audio message could be incorporated in the gift itself.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
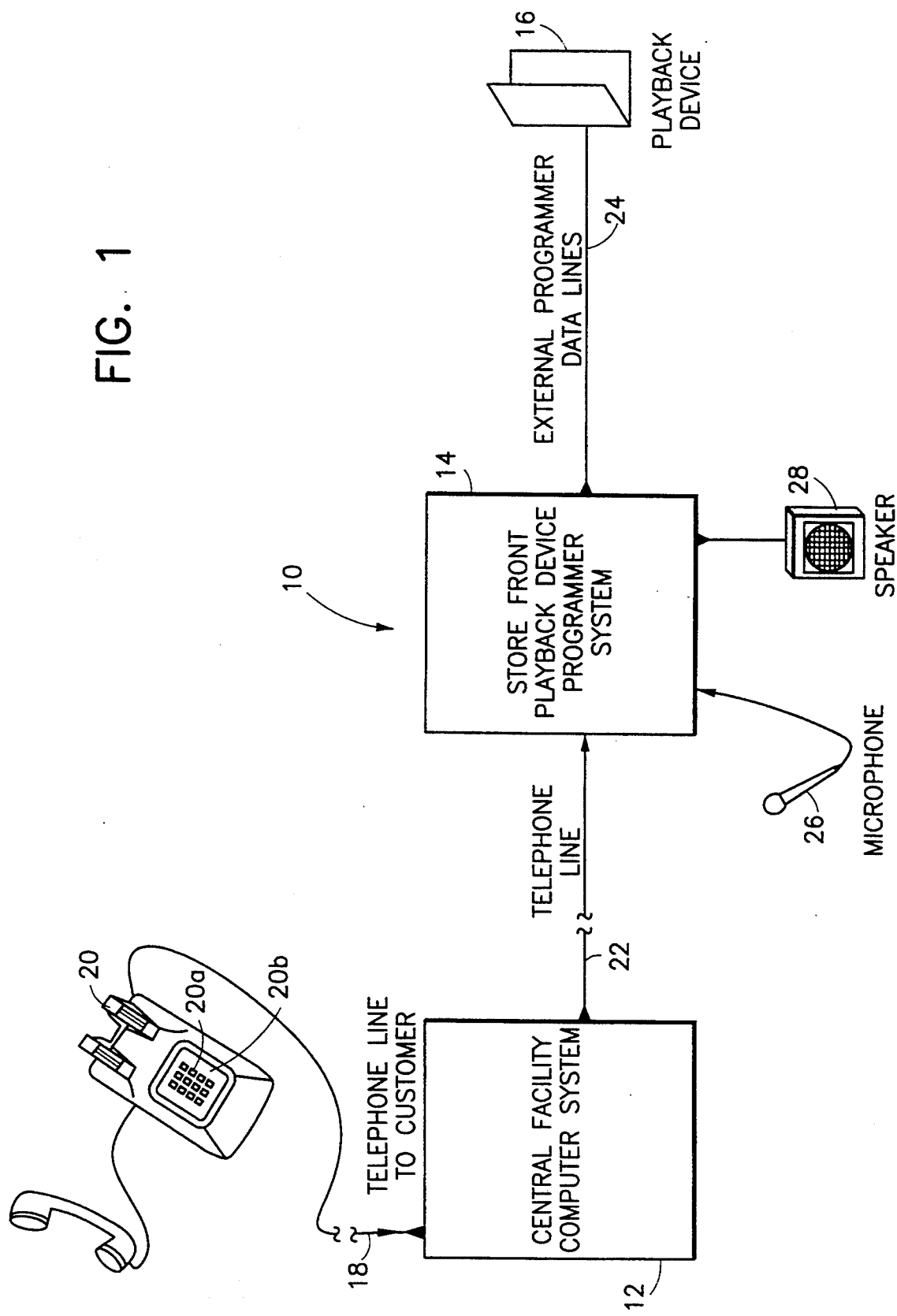
FIG. 1 is a block diagram of the system of the invention for recording and delivering personalized audio messages.

The system for recording and delivering personalized audio messages 10 of the invention is shown in FIG. 1. The system 10 broadly includes a central facility computer system 12, a store front programming system 14, and a portable playback device 16. The central facility computer system 12 interfaces with a customer at a remote location over a communications channel 18 (e.g., a first telephone line). The customer conveys into a touch tone telephone 20 a personalized audio message which is digitally recorded at the central facility 12 for programming via the store front programming system 14 onto the portable playback device 16. In particular, as described in more detail hereinafter, the store front playback device programmer system 14 receives the digital audio message from the central facility 12 via a second communications channel 22 ( e.g., second telephone line ) and programs the portable playback device 16 with the audio message via external programmer data lines 24.

The portable playback device 16 may advantageously take the form of a greeting card with an audio semiconductor chip (known in the art) which stores an original audio message of a user in digital or analog form for later playback. A microphone 26 may be attached to the store front system 14 for in-store demonstrations and to enable a user to record a message at the store front system 14 instead of at a remote location. A speaker 28 may also be provided at the store front system 14 so that the audio message can be heard during a demonstration.

Figure 2:
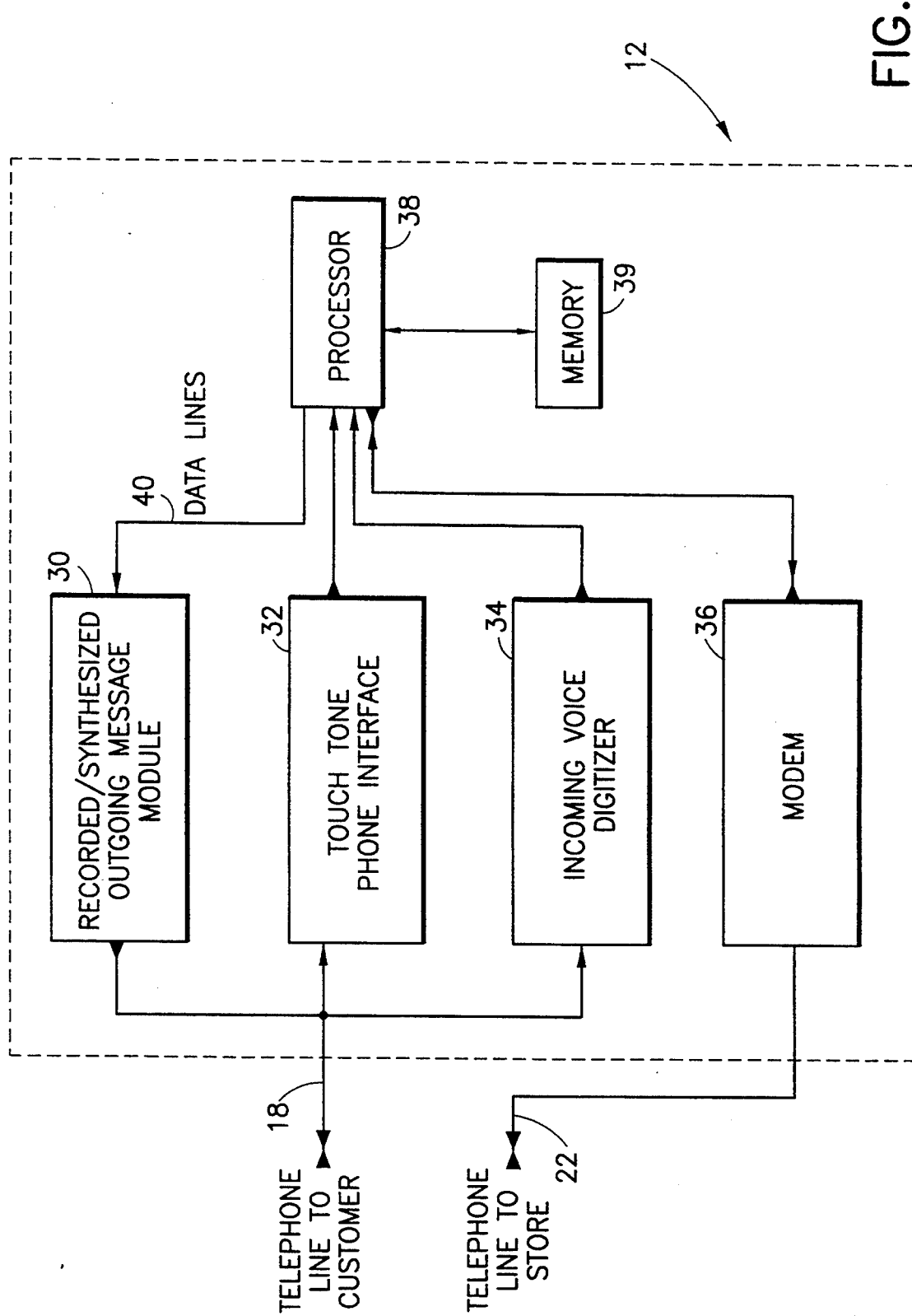
FIG. 2 is a block diagram of the central facility computer system of FIG. 1.

The central facility computer system 12 as shown in FIG. 2 generally includes a recorded/synthesized outgoing message module 30, a touch tone phone interface 32, an incoming voice digitizer 34, a modem 36 and a processor 38. When a telephone call is placed to the central facility 12 via line 18, the touch tone phone interface 32 informs the processor 38 of an incoming call. Under control of the processor 38, recorded or synthesized computer voice messages which are stored and/or generated in the outgoing message module 30 are played over line 18. The computer voice messages generally instruct the remote user to choose from various options available. In response to the computer voice messages and instructions provided by the message module 30, the customer presses a sequence of keys 20a on the touch tone telephone 20 keypad 20b (see FIG. 1). This information is received by the touch tone phone interface 32.

The touch tone phone interface 32 provides the computer or processor 38 with an interface to the phone line 18. The interface 32 receives the touch tone signals from the telephone 20 via the telephone line 18, converts the incoming touch tone signal to a digital signal and transmits the digital signal directly to the processor 38 via internal data lines 40. The processor 38 receives the information based on the received information decides on the next appropriate step. For example, the central facility system 12 might request from the customer, via the outgoing message module 30, a credit card number for payment. Upon receiving a valid credit card number (and automatically checking the same with the credit card company via modem 36), the processor 38 might request via the outgoing message module 30 that the customer provide the ZIP code of the recipient. Again, this information would be provided by the customer as touch tone signals, and received via the touch tone phone interface for storage by the processor. Then, the message module 30 might be activated to request the address of the customer, and the address of the recipient, which information would be provided by voice. After all of that information is obtained, the processor 38 might instruct the customer to provide the message which is to be stored on the playback device (e.g., greeting card) 16.

As aforementioned, it is the processor 38 which controls the message module 30, and thereby instructs the customer to provide desired information. If the customer provides a touch tone in response to the instructions of the message module 30, the touch tone phone interface 32 converts the signal into a digital signal for use by the processor 38. However, when the customer provides voice information, as opposed to a touch tone signal response, the incoming voice digitizer 34 converts the voice information into a digital signal which is then sent to and stored in memory 39 associated with the processor 38. If desired, the central facility computer system 12 can be provided with a playback capacity as described hereinafter with reference to the store front system of FIG. 3. This would permit the customer to listen to the message that the customer provided and change it by overwriting the message stored in memory 39. Eventually, the information stored by the memory 39 must be forwarded via the modem 36 to the store front playback device programmer system 14. The forwarding of the information may be done automatically by having the processor 38 compare the ZIP code of the intended receiver of the message to a list stored in a memory containing the ZIP codes of store front playback device programmer systems 14. Once a match is made, the processor 38 can dial the. appropriate store front 14 via the modem 36 and the telephone line 22, and send the digitized address information and message. Alternatively, rather than comparing the ZIP codes and sending the information automatically, an operator at the central facility computer system 12 can manually determine where the information is to be sent, and then instruct the processor 38 to send the information contained in the memory 39. As a further alternative, rather than sending the digitized message and other accompanying information, the central facility computer system can send a code or message to the appropriate store front 14 that a digitized voice message is being stored at the central facility computer system for pick-up by the store front. The digitized voice message could then be accessed by a call placed by the store front to the central facility computer system at an appropriate time.

It should be appreciated, that if desired, the central facility computer system 12 can be provided with the ability to play back the message stored in memory 39 so that a customer can listen to the message and override the message with a different message if the message is not suitable. The ability to play back the message would typically involve a message in the outgoing message module 30 which would ask the customer to press a certain telephone button or sequence of buttons to hear the message. Upon receiving the signals via the touch tone phone interface 32, the processor 38 would cause the message stored in memory 39 to pass through the outgoing message module 30 or a similar module (not shown) which would use the data stored in memory to generate an analog signal which would be sent out over telephone line 18 to the customer.

The memory 39 of the central facility computer system is preferably very large, so that numerous messages from different customers can be stored over an extended period of time (e.g., one or more weeks). In this manner a record is obtained so that ultimately, if the playback device does not contain an intelligible message, the digital message may be re-obtained from the central facility computer system.

It should be noted that while it is expected that the central facility computer system will be coupled to a standard telephone line, it is envisioned that the system can be utilized with via other communications channels such as the digital network or with a cable or satellite system. In such systems, the modem 36 might not be required, but would typically be replaced with a data pump, RF generator, or other interface which would interface with the communications system of choice.

Figure 3:
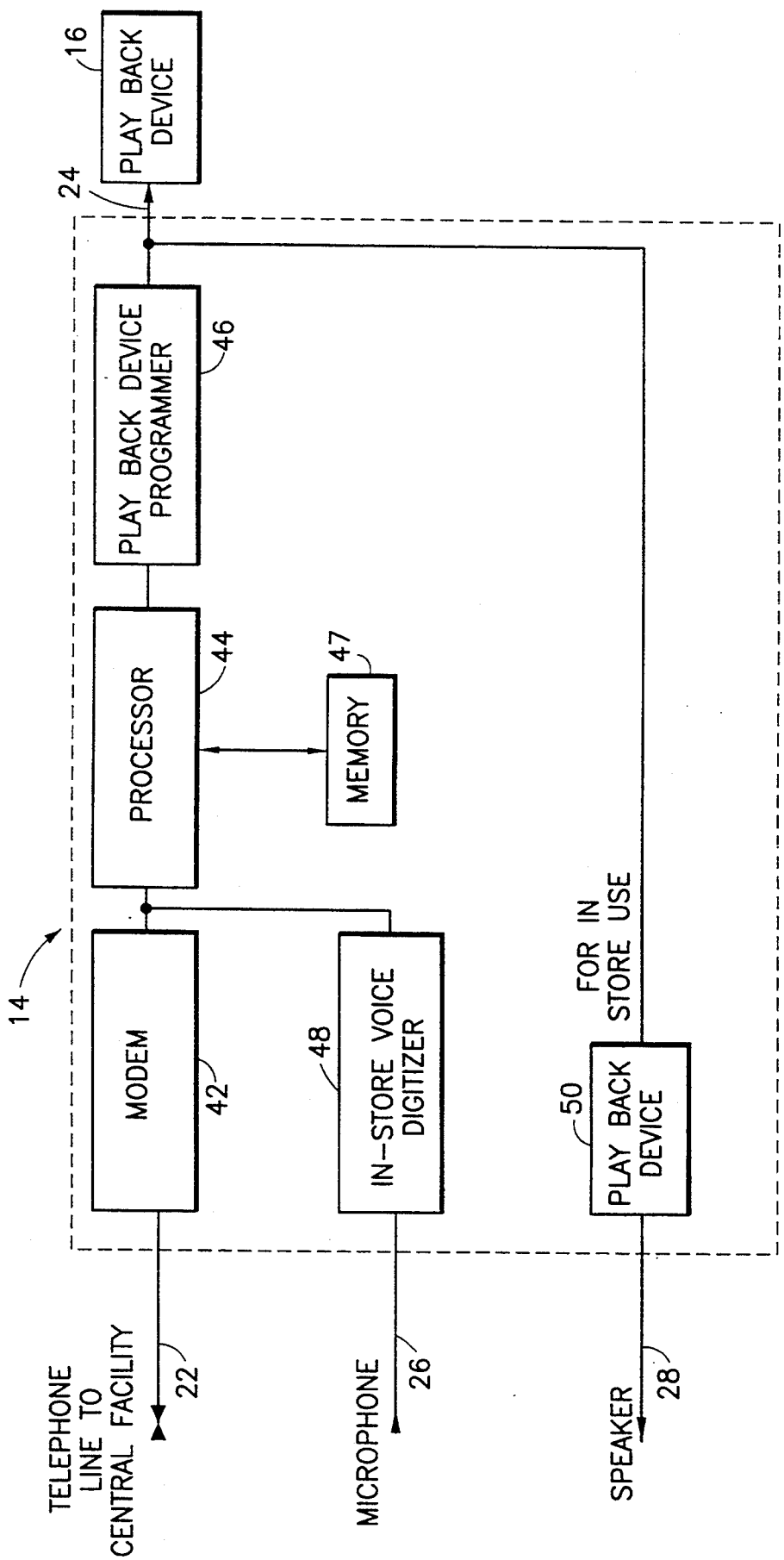
FIG. 3 is a block diagram of the store front programming system of FIG. 1.

The store front playback device programmer system 14 is seen in FIG. 3 and preferably includes a modem 42, a processor 44, a playback device programmer 46, an in-store voice digitizer 48, and an internal playback device 50. The store front system 14 has two primary functions. The first primary function of the store front system 14 is to receive the digital data and audio message from the central facility system 12 (or directly from the customer). The second primary function is to program the portable playback device 16 with the digital personal audio message.

The modem 42 of the store front system 14 is connected to the modem 36 of the central facility system 12 via telephone line 22. The modem 42 of the store front system receives the (now modulated) digital address and other non-message information as well as the personal audio message information from the processor 38 of the central facility system 12, demodulates the data, and then relays the information to the processor 44 of the store front system 14. The processor 44 separates out the address and other non-audio message information (if any) from the personal audio message, and can store both the address, the non-audio information, and personal audio message in associated memory 47. Alternatively, and although not preferred, rather than storing the personal audio message in memory 47, the personal audio message can be sent directly to the playback device programmer 46 provided that a playback device is connected and available to be programmed. Regardless, eventually, the playback device programmer 46 receives the personalized audio message from the processor 44 and under control of the processor 44 writes the message via the external programmer lines 24 to the portable playback device 16. Typically, the external programmer lines 24 include address lines, data lines, a data ready line, and a program enable line, and are coupled directly to the nonvolatile memory of the playback device.

The audio message is stored in the playback device 16 in a manner in which permits the portable playback device 16 to reconstruct the personalized audio message at a later time. Under control of the store front proprietor or employee, the address and other non-audio information is separately provided to the playback device programmer 46 which provides the information to the in-store playback device 50. Thus, the address of the recipient of the playback device 16 is obtained and manually recorded by the store front proprietor or employee, so that the playback device 16 may be properly delivered. If desired, an address label or identification (not shown) may be correspondingly printed and attached to the playback device. It will be appreciated that where the store front is a flower shop or the like, the playback device 16 typically will be a card or ornament which will accompany and be delivered with flowers. Where the store front is a teddy bear delivery service, the playback device 16 may be incorporated directly onto or into the teddy bear (with an external switch), and the teddy bear is typically delivered by the mail or delivery service.

The in-store voice digitizer 48 is similar to the voice digitizer 34 of the central facility system 12. The voice digitizer 34 provides a second mechanism for a customer to provide a personalized audio message, while also enabling in-store demonstrations. In particular, if a customer is at a store front and desires to provide a personalized audio card, the customer can use the external microphone 26 connected to the store front system 14 to record the personalized audio message. The audio message, which is converted to a digital signal by the in-store voice digitizer 34, is provided to the processor 44. The processor then forwards the digital message to the playback device programmer 46. Under control of the processor 44 or manual control, the playback device programmer provides the message either to the internal playback device 50, or to the portable playback device 16 for storage thereon. The internal playback device 50 in the store front system 14 is similar to the portable playback device 16, which will be discussed in more detail hereinafter; except for the external speaker 28 which is connected to the internal playback device 50. The external speaker 28, which may take the form of headphones, is used for listening to the personalized audio message at the store front system 14 location during in-store demonstrations.

Figure 4:
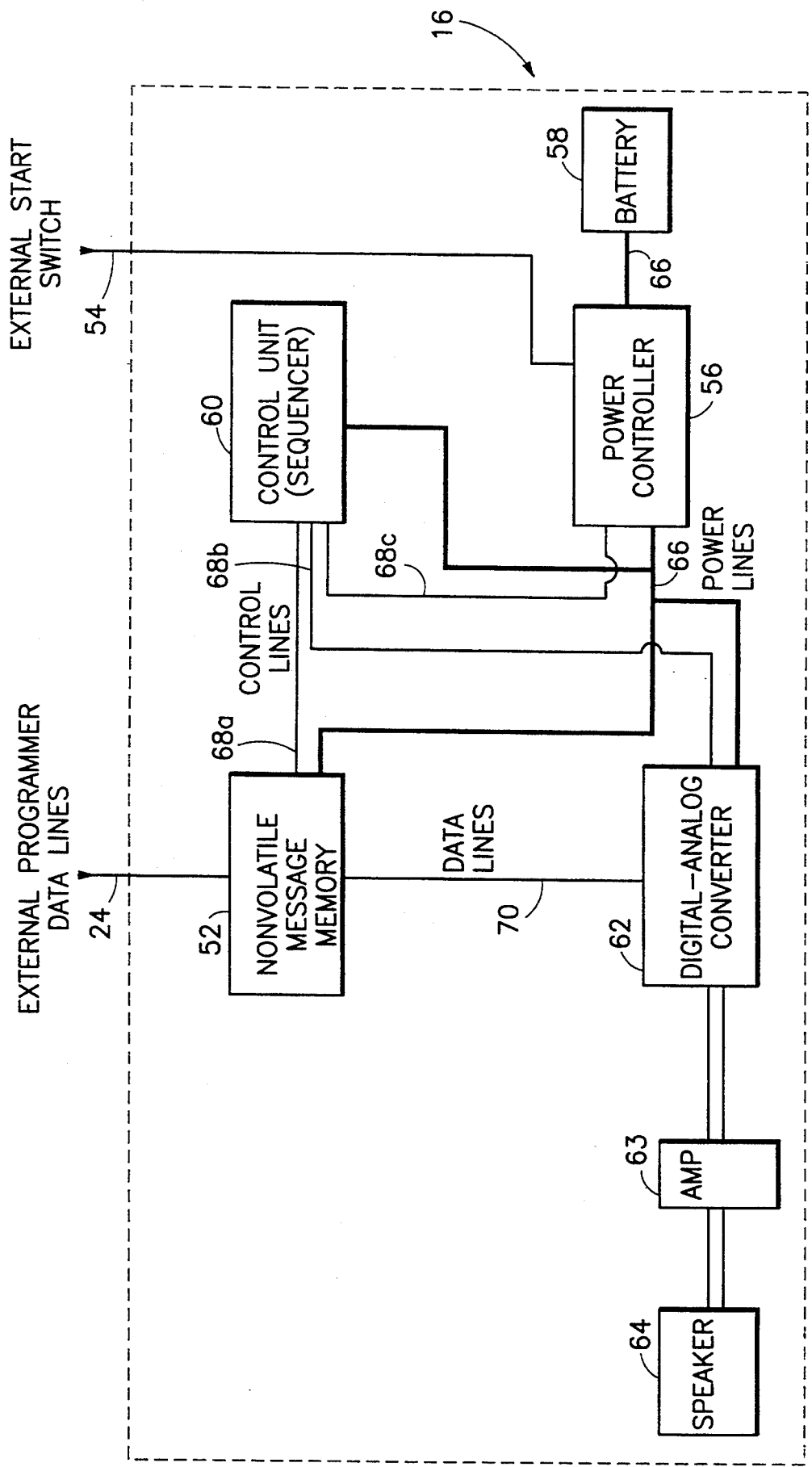
FIG. 4 is a block diagram of the portable playback device of FIG. 1.

As seen in FIG. 4, a first embodiment of the portable playback device 16 includes a nonvolatile message memory chip 52, an external start switch 54, a power controller module 56 which is coupled to the external start switch 54 and the memory chip 52, a battery 58 which is coupled to the power controller 56, a control unit (sequencer) 60 which is coupled to both the power controller 56 and the nonvolatile message memory 52, a digital-to-analog (D/A) converter 62 coupled to the nonvolatile message memory 52, to the sequencer 60, and to the power controller 56, an amplifier 63 coupled to the D/A converter, and a speaker 64 coupled to the amplifier 63. The digital audio message received from the playback device programmer 46, via the external programmer data lines 24 by the portable playback device 16, is stored in the nonvolatile message memory 52. The message memory 52 is nonvolatile and retains the stored digital audio message even when the power is turned off.

The external start switch 54 acts as the mechanism for supplying power to the unit, and must be (dis)engaged to activate the portable playback device 16. In the preferred embodiment, and as is known in the art, the external start switch 54 (dis)engages when the user, e.g., opens up the greeting card, or presses the switch on a teddy bear or ornament. Since the external start switch 54 is connected to the power controller module 56, the power controller module 56 conserves the power in the battery 58 by only allowing power through the power lines 66 to the message memory 52, digital-analog converter 62 and control unit 60 when the external start switch 54 has been engaged. Also, when the recorded audio message is completed, the power control module 56 removes the power from the message memory 52, digital-analog converter 62 and control unit 60, thereby saving power and extending the battery 58 life.

When initiated or started by the power controller 56, the control unit 60 starts the sequencing of the digital audio message from the message module 52 to the digital-analog converter 62. The control unit 60 accomplishes the sequencing by providing memory addresses sequentially over control line 68a to the message memory 52. As a result of the sequencing, the digital audio message is sent from the message memory module 52 via data lines 70 to the D/A converter 62 which converts the digital audio message into an analog signal. It is noted that the control unit 60 also provides control signals such as a clock signal over control line 68b to the digital-analog converter 62 so that the D/A converter will know that the data on data lines 70 are valid. Once converted, the analog signal is amplified by the amplifier 63 and provided to the speaker 64 which plays the personalized audio message. If the central facility computer system 12 and the playback device 16 are provided with enough resolution, the personalized audio message as heard via the speaker 64 will closely approximate the voice of the customer. After the audio message is completed, the control unit 60 informs the power controller 56 via control line 68c that the message is over, an causes the power controller 56 to shut down the playback device 16 in order to conserve power.

It should be noted that the playback device 16 of the invention does not have an external switch for permitting the nonvolatile message memory to be overwritten. While it is preferred that a standard audio chip such as the VP1000 of Electech Electronics of Industry, California, be used which provides a "recording" port as well as a playback port (data line 70), according to the invention, the recording port of the audio chip is accessed only by the playback device programmer 46 of the store front system 14. In other words, the playback device programmer 46 is provided with a line or pin 24 (see FIG. 3) which permits the audio chip to be recorded, while no mechanism is provided for the receiver of the audio chip to record over the the message memory 52. In this manner, the object of providing a system for generating personalized audio messages for greeting cards or other devices where the message cannot be mistakenly overwritten by the receiver of the card or device is met.

Figure 5:
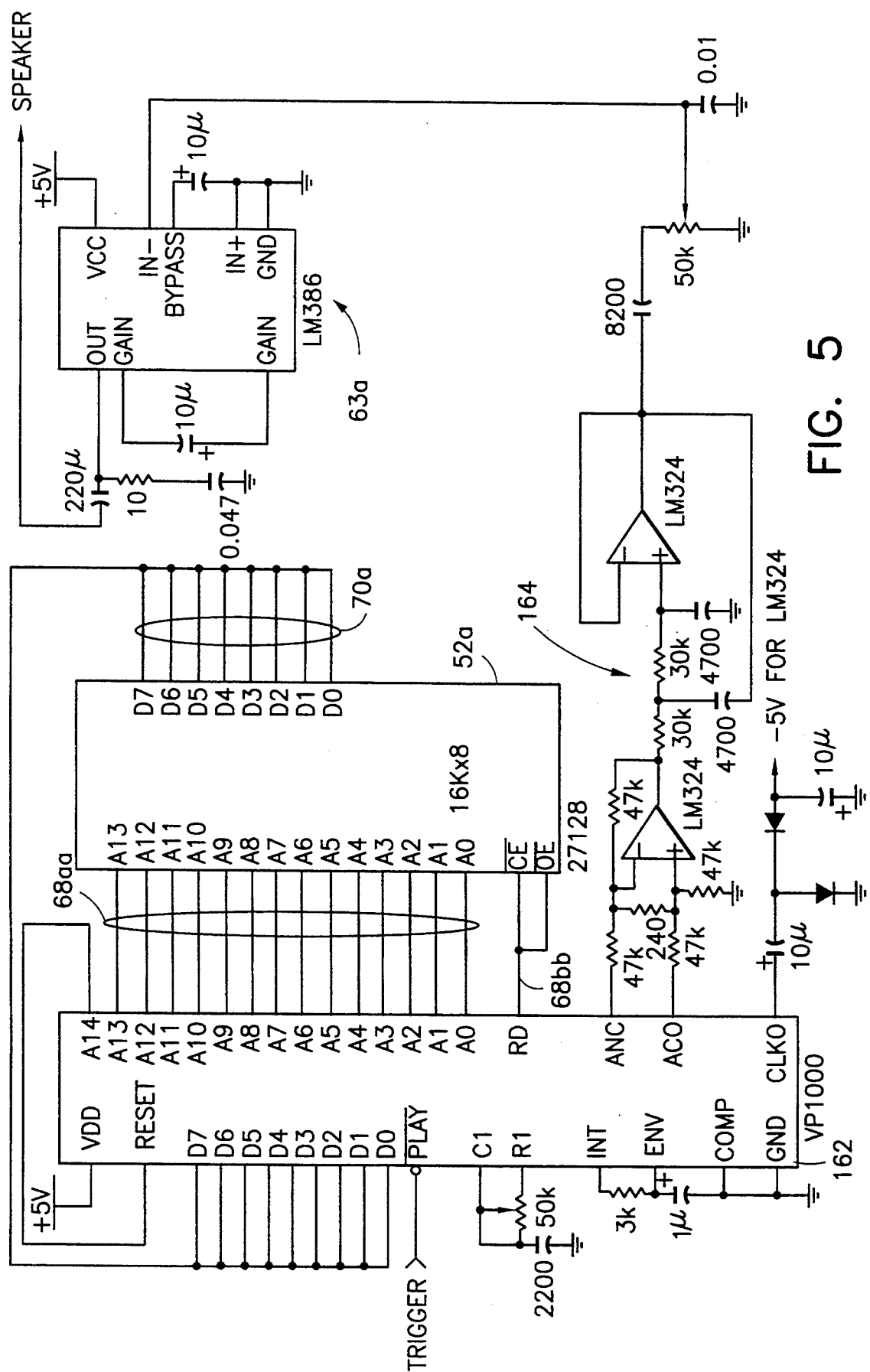
FIG. 5 is a circuit diagram of a portion of the portable playback device of FIG. 1.

For purposes of completeness, a single-message playback-only circuit provided by Electech Electronics and suitable for the invention is seen in FIG. 5. The circuit includes a VP1000 chip 162, an EPROM memory 52a which is coupled by data lines 70a, address lines 68aa, and a control line 68bb to the VP1000 chip, a filter circuit 164, and a power amplifier circuit 63a. It should be appreciated that the VP1000 chip effectively incorporates the control unit 60 and the D/A converter 62 of FIG. 4. It should also be appreciated that while the EPROM memory 52a of FIG. 5 is shown as a 16K by 8 bit memory, different amounts of memory with different resolution (different bit width) could be utilized.

While utilization of an EPROM or other "digital" nonvolatile memory device is set forth above with reference to FIGS. 4 and 5, it should be appreciated that a nonvolatile solid state analog memory device such as the ISD1100 chip of Information Storage Devices Corp. of Sunnyvale, Calif. can also be utilized. The ISD1100 chip stores analog signals at one of two hundred fifty-six (8 bit) levels into a single cell without the need of A/D and D/A conversion. The ISD1100 chip would effectively replace the nonvolatile message memory 52 and D/A converter 62 of FIG. 4. To accommodate use of the ISD1100 chip, the playback device programmer 46 of the store front system 14 would generate an analog signal which would be stored in the ISD1100 chip. It should be noted that where a microphone 26 was used at the store front system, the audio information could be provided via an analog interface (not shown) to the ISD1100 chip, rather than being digitized by the digitizer 48, etc. However, it is still preferable that all communications between the central facility computer system 12 and the store front system 14 be digital, as modulated digital data is less susceptible to noise.

Figure 6:
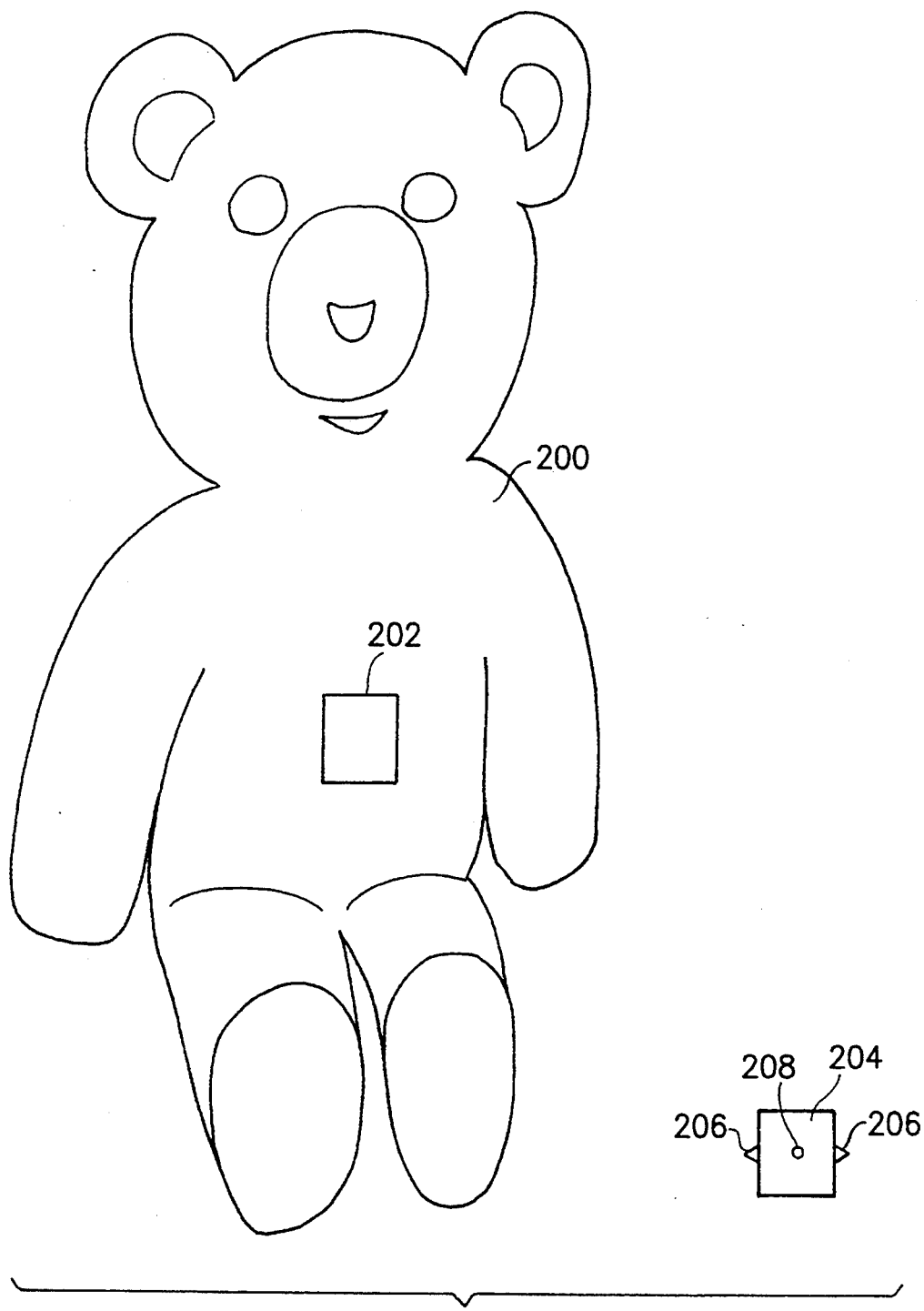
FIG. 6 is schematic representation of a teddy bear incorporating the portable playback circuitry of FIG. 4.

While the system of the invention has been described primarily with reference to providing a non-erasable audible message on a greeting card, it will be appreciated that the system of the invention can be applied to generate non-erasable audible messages on other types of portable playback devices. For example, and not by way of limitation, the portable playback device can take the form of an ornament or a stuffed animal. In the case of the latter, and as seen in FIG. 6, a receptacle 202 is provided in the stuffed animal (teddy bear) 200 for receiving a power supply, a message memory and associated circuitry, and a speaker. Preferably, the power supply, message memory and associated circuitry, and speaker are provided together as a package 204 with latches 206 which are arranged to engage the receptacle 202 and hold the package therein. The package 204 preferably includes an external switch 208 for activating playback of the message. In addition, the package 204 is preferably designed such that the battery (which is preferably a "button" type battery) is readily replaceable upon removal of the package from the receptacle.

Figure 7:
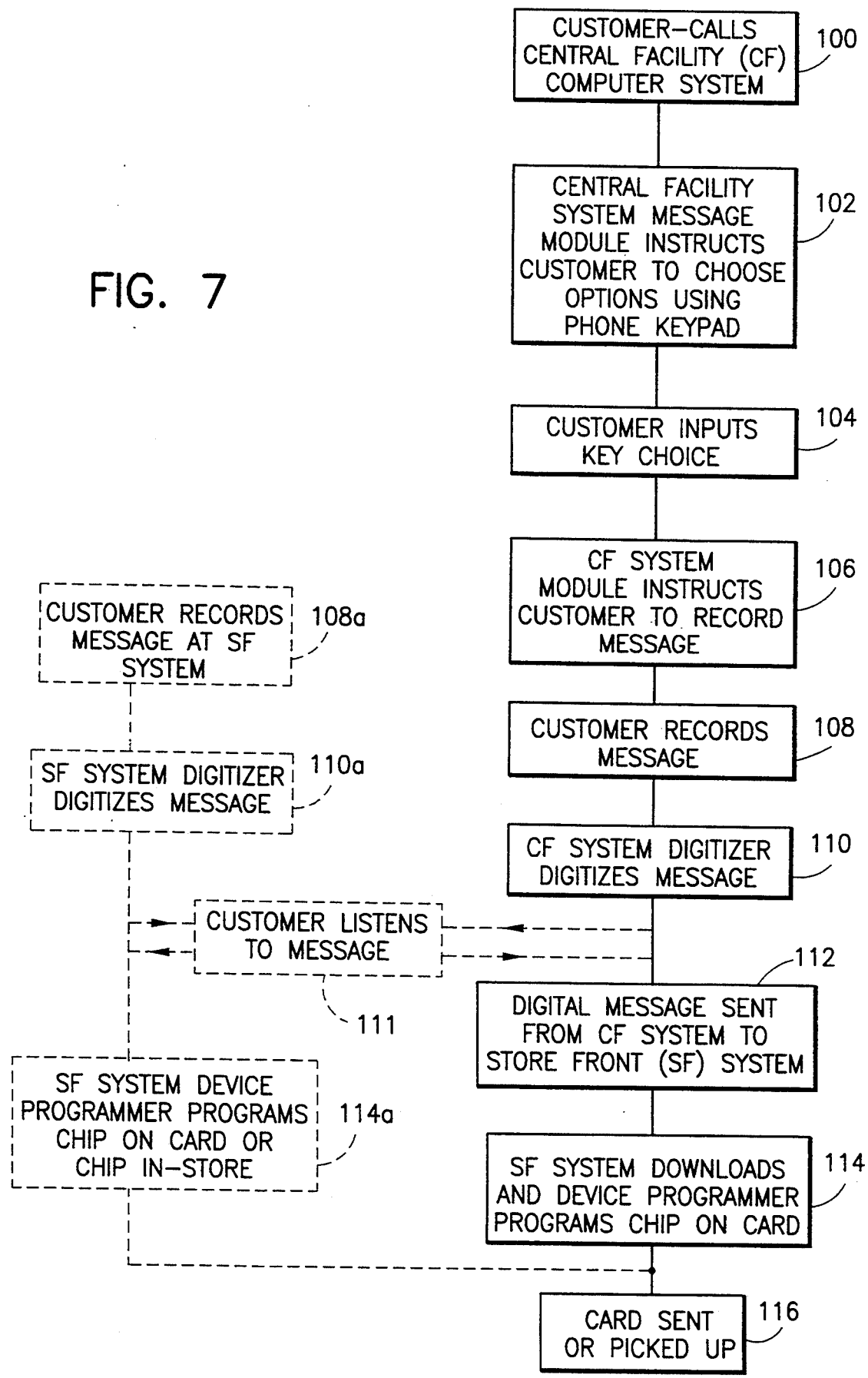
FIG. 7 is a flowchart of the preferred method of recording and delivering personalized audio messages.

It will be appreciated that the method of the invention closely parallels the system of the invention. As seen in FIG. 7, at 100, the customer directly calls the central facility computer system, although if the customer calls a store front, the store front can connect the customer to the central facility. Upon reaching the central facility, at 102, the message module of the central facility instructs the customer to provide certain information by using the keypad of the telephone. At 104, the user presses the buttons of the telephone keypad. When verbal information (e.g., addresses or a message) is required, at 106, the message module instructs the customer to provide such verbal information. At 108, the customer provides the necessary verbal information which is digitized at 110 by the incoming voice digitizer 34 of the central facility. As previously described, the central facility may be provided with the ability to permit the customer to listen at 111 to the message which the customer is providing. When, the customer is satisfied, the digitized information is sent at 112 from the central facility to an appropriate store front. At 114, the store front system receives the information, separates out address and non-germane information (if any) from the digitized message, and programs the digitized message on the chip was is attached to a portable device (e.g., a greeting card, ornament, teddy bear or the like). At 116, the portable device is either sent or hand-delivered to, or picked up by the intended receiver of the portable device.

As shown in phantom, it is possible for the customer to visit a store front directly and record the message at 108a. The customer can directly provide an audio message which is digitized at 110a by the in-store voice digitizer 48. If desired, the customer can listen at 111 to the audio message via the in store play back device 50, and change the message by re-recording. Eventually, at 114a, the digitized audio message is programmed onto the portable device 16, which is sent to or picked up by the intended receiver of the portable device at step 116.

There have been described and illustrated herein a system and device for recording and delivering personalized audio messages. While particular embodiments of the invention have been described, it is not intended that the invention be limited thereto, as it is intended that the invention be as broad in scope as the art will allow and that the specifications be read likewise. Thus, while the described system only referenced a single customer, the system can be configured for use by many customers at the same time. Likewise, while only one store front system was described, it is intended that a network of store fronts be provided with store front playback device programmer systems. Further, while particular high level circuitry has been shown, it will be appreciated that other circuitry accomplishing similar results could be utilized. It will therefore be appreciated by those skilled in the art that yet other modifications could be made to the provided invention without deviating from its spirit and scope so claimed.

We claim:

1. A system for recording and delivering a personalized audio message of a customer provided by the customer to a central facility via a communication channel and delivered from the central facility via a communication line, comprising:
   a) a central facility computer system located at a first location and having a voice digitizer, a processor means, and an outgoing communication line interface means, wherein said processor means is coupled to said voice digitizer, and to said outgoing communication line interface means, wherein an audio message provided by the customer is digitized by said processor means, and said processor means causes data representing said audio message to be provided to said outgoing communication line interface means;
   b) a plurality of playback device programmer systems located at a plurality of second locations and each having an incoming communication line interface means, a second processor means coupled to said incoming communication line interface means, and a playback device programmer means coupled to said second processor means, said incoming communication line interface means for receiving said data representing said audio information from said outgoing communication line interface means and for providing said audio information as digital information to said second processor which in turn provides said digital information to said playback device programmer means; and
   c) a portable playback device having a power switch, a power supply coupled to said power switch, a message memory, and a speaker means coupled to said power supply and to said message memory, wherein said message memory means is programmed by said playback device programmer means to store information representing said audio information, and upon said power switch being activated, said portable playback device is powered by said power supply such that said information stored by said message memory means is provided to said speaker means and causes said speaker means to provide a substantial equivalent of said personalized audio message.

2. A system according to claim 1, wherein:
said central facility further includes an outgoing message module coupled to and controlled by said processor and to the communication channel, said outgoing message module providing instructions from said central facility to the customer.

3. A system according to claim 1, wherein:
the communication channel is a telephone line, and
said central facility computer system further includes a telephone interface means coupled to said processor means, wherein said telephone interface means interfaces with the telephone line such that touch tone information provided by the customer is provided via the telephone interface means to said processor means, and audio information including said audio message provided by the customer is provided via the incoming voice digitizer to said processor means.

4. A system according to claim 2, wherein:
the communication channel is a telephone line, and said central facility computer system further includes a telephone interface means coupled to said processor means, wherein said telephone interface means interfaces with the telephone line such that touch tone information provided by the customer is provided via the telephone interface means to said processor means, and audio information including said audio message provided by the customer is provided via the incoming voice digitizer to said processor means, and wherein said processor means causes said outgoing message module to provide messages to the customer via the telephone line based on at least the touch tone information provided by the customer.

5. A system according to claim 1, wherein:
said central facility computer system further includes central facility memory means coupled to said processor means, said central facility memory means for storing at least some of said digitized audio message.

6. A system according to claim 3, wherein:
said central facility computer system further includes central facility memory means coupled to said processor means, said central facility memory means for storing at least some of said digitized audio message, and
said central facility memory means also stores information regarding said plurality of second locations, and said processor compares said information regarding said plurality of second locations with touch tone information relating to a location provided by said customer in order to determine to which of said plurality of second locations to send said data representing said audio message.

7. A system according to claim 1, wherein:
said memory means of said portable playback device comprises a nonvolatile memory, and said portable playback device further includes a control means coupled to said nonvolatile memory, and a power controller means coupled to said control unit, to said power supply, to said power switch, and to said nonvolatile memory, said power controller means for providing power to said nonvolatile memory and to said control-unit, wherein said control unit, upon receiving an indication from said power controller means that said power switch has been activated causes said nonvolatile memory to sequentially send said information representing said audio information to said speaker.

8. A system according to claim 7, wherein:
said nonvolatile memory, said control means, and said power controller means of said portable playback device are included in a single semiconductor device having a plurality of ports, wherein a first of said plurality of ports is coupled to said power switch, a second of said plurality of ports is coupled to said power supply, and a third of said plurality of ports is accessible to said playback device programmer means when said playback device programmer means programs said message memory means.

9. A system according to claim 7, wherein:
said portable playback device further includes a digital-to-analog converter coupled between said nonvolatile memory means and said speaker, wherein said information stored in said nonvolatile memory means is digital information, and said digital information is converted by said digital-to-analog converter into an analog signal for said speaker.

10. A system according to claim 1, wherein:
at least one of said playback device programmer systems includes a voice input means, and a second voice digitizer coupled to said voice input means and to said second processor means, said voice input means for directly receiving a vocal message, wherein said second voice digitizer digitizes said vocal message and provides a digital representation of said vocal message to said second processor means.

11. A system according to claim 10, wherein:
said at least one of said playback device programmer systems further includes a second playback device coupled to said second processor means, for receiving said digitized representation of said vocal message and providing an audible facsimile of said vocal message.

12. A system according to claim 1, wherein:
each said playback device programmer system includes a second memory means coupled to said second processor means, said second memory means for receiving and storing at least one of said digital information representing said audio message and digital information accompanying said digital information representing said audio message.

13. A system according to claim 11, wherein:
said voice input means comprises a microphone,
said second playback device includes a second speaker, and
each said playback device programmer system includes a second memory means coupled to said second processor means, said second memory means for receiving and storing at least one of said digital information representing said audio message and digital information accompanying said digital information representing said audio message.

14. A system according to claim 1, wherein:
said outgoing communication line interface means comprises a first modem, and said incoming communication line interface means comprises a second modem.

15. A system according to claim 1, wherein:
said portable playback device is a greeting card.

16. A system according to claim 1, wherein:
said portable playback device is a stuffed animal.

17. A system for recording and delivering a personalized audio message of a customer provided by the customer to a central facility via a communications channel and delivered from the central facility via a communication line, comprising:
a) a central facility computer system located at a first location and having an outgoing message module, a communications channel interface means, a voice digitizer, a processor means, a memory means, and an outgoing communication line interface means, wherein said processor means is coupled to said outgoing message module, to said communications channel interface means, to said voice digitizer, to said memory means, and to said outgoing communication line interface means, and said processor means controls said outgoing message module, wherein said communications channel interface means interfaces with the communications channel such that non-audio message information provided by the customer is provided via the communications channel interface means to said processor means, and audio message information provided by the customer is provided via the incoming voice digitizer to said processor means, and said processor means causes said outgoing message module to provide messages to the customer via the communications channel based on at least the non-audio message information provided by the customer, and said processor means further causes data representing said audio information to be provided to said outgoing communication line interface means;

b) a playback device programmer system located at a second location and having an incoming communication line interface means, a second processor means coupled to said incoming communication line interface means, and a playback device programmer means coupled to said second processor means, said incoming communication line interface means for receiving said data representing said audio information from said outgoing communication line interface means and for providing said audio information as message information to said second processor which in turn provides said message information to said playback device programmer means; and c) a portable playback device having a power switch, a power supply coupled to said power switch, a message memory means, and a speaker means coupled to said power supply and to said message memory means, wherein said message memory means is programmed by said playback device programmer means to store said message information representing said audio information, and upon said power switch being activated, said portable playback device is powered by said power supply such that said message information stored by said message memory means is provided to said speaker means and causes said speaker means to provide a substantial equivalent of said personalized audio message.

18. A system according to claim 17, wherein:
said portable playback device further includes a power controller coupled to said power supply and to said power switch, wherein said power controller controls power to said control unit and to said message memory.

19. A system according to claim 18, wherein:
said portable playback device further includes a digital-to-analog converter coupled between said message memory means and said speaker, wherein said message information stored by said message memory means is digital information, and said digital-to-analog converter converts said digital information to analog information for playback by said speaker.

20. A system according to claim 17, wherein:
said playback device programmer system includes a voice input means, and a second voice digitizer coupled to said voice input means and to said second processor means, said voice input means for directly receiving a vocal message, wherein said second voice digitizer digitizes said vocal message and provides a digital representation of said vocal message to said second processor means.

21. A system according to claim 20, wherein:
said playback device programmer system further includes a second playback device coupled to said second processor means, for receiving said digitized representation of said vocal message and providing an audible facsimile of said vocal message, and wherein
said voice input means comprises a microphone, and
said second playback device comprises a sound speaker/amplifier.

22. A system according to claim 17, wherein:
said outgoing message module of said central system provides outgoing messages by doing at least one of
storing recorded messages and providing said recorded messages to the customer via the communications channel, and
synthesizing messages and providing said the synthesized messages to the customer via the communications channel.

23. A system according to claim 17, wherein:
said communications channel comprises a telephone line, said outgoing communication line interface means comprises a first modem, and said incoming communication line interface means comprises a second modem.

24. A method for recording and delivering a personalized audio message of a customer provided by the customer to a central facility via a communications channel and delivered from the central facility via a communication line, comprising:
a) receiving the personalized audio message at the central facility via the communication channel;
b) digitizing the received personalized audio message, and storing the resulting digital information;
c) sending the stored digital information from the central facility to a store front facility in coded format substantially resistant to noise via the communication line;
d) receiving said digital information at said store front facility via the communication line;
e) decoding said digital information at said store front facility;
f) programming a memory of a portable playback device with said resulting digital information or information related thereto; and
g) causing said portable playback device with said memory to be delivered to an intended recipient.

25. A method according to claim 24, wherein:
said programming a memory comprises fixing said memory in said portable playback device, wherein said portable playback device comprises one of a card, an ornament, and a stuffed animal.

* * * * *